United States Patent [19]

Whalen

[11] Patent Number: 4,637,275

[45] Date of Patent: Jan. 20, 1987

[54] TORQUE FEEDBACK TRANSMISSION

[76] Inventor: Brian L. Whalen, 102 New York Ave., Smithtown, N.Y. 11787

[21] Appl. No.: 649,691

[22] Filed: Sep. 12, 1984

[51] Int. Cl.$^4$ ............................................. F16H 47/04
[52] U.S. Cl. ...................................... 74/687; 74/677; 74/740
[58] Field of Search .......................... 74/687, 677, 740

[56] References Cited

U.S. PATENT DOCUMENTS

| | | | |
|---|---|---|---|
| 3,090,253 | 5/1963 | Linsley et al. | 74/687 |
| 3,396,607 | 8/1968 | Ross | 74/687 |
| 3,427,899 | 2/1969 | Gunderson et al. | 74/687 |
| 3,455,184 | 7/1969 | Frandsen et al. | 74/687 |
| 3,733,931 | 5/1973 | Nyman et al. | 74/687 X |
| 3,903,756 | 9/1975 | Hamma | 74/687 |
| 4,089,237 | 5/1978 | Scholz | 74/740 X |
| 4,109,550 | 8/1978 | Murayama | 74/687 X |
| 4,134,310 | 1/1979 | Orshansky et al. | 74/687 |
| 4,232,570 | 11/1980 | Gibson | 74/687 X |
| 4,259,881 | 4/1981 | Meyerle | 74/687 |
| 4,363,247 | 12/1982 | Weseloh | 74/687 |

FOREIGN PATENT DOCUMENTS 2829304  1/1980  Fed. Rep. of Germany ........ 74/687

*Primary Examiner*—Leslie A. Braun
*Assistant Examiner*—Joseph M. Rolnicki
*Attorney, Agent, or Firm*—Leonard Belkin

[57] ABSTRACT

A torque feedback hydromechanical transmission having one or more planetary gear trains. In one embodiment, feedback comprises a variable displacement hydraulic motor mechanically interconnected to the input shaft and a fixed displacement hydraulic pump driven by the ring gear and supplying hydraulic fluid to the motor. Control over torque and speed ratio is exercised by adjusting displacement within the motor. In other embodiments some of the feedback is mechanical in order to reduce the load on the hydraulic motor and pump.

1 Claim, 4 Drawing Figures

TORQUE FEEDBACK TRANSMISSION

BACKGROUND OF THE INVENTION

This invention relates to a torque feedback transmission and more particularly to a transmission which is capable of providing perfect coupling between input and output torque and speed without the need for clutching and shifting mechanisms.

There are a variety of transmissions which are capable of matching input torque and speed to load requirements but such transmission generally require clutching or shifting mechanisms to make the matching of load to input perfect over the full range of operation. Transmissions of this type are shown in U.S. Pat. Nos. 3,709,060, 3,714,846, 3,783,711, 3,888,139, 3,988,949, and 4,008,628. It will be noted that in all of these patents there is some provision for clutching or shifting to move between different ranges of operation. It is further to be noted in connection with these patented transmissions that in most cases the arrangements are quite complex and hence expensive to manufacture and maintain.

SUMMARY OF THE PRESENT INVENTION

In the present invention there is provided a transmission of relatively simple construction which is capable of providing infinitely variable coupling between input torque and speed on the one hand and output torque and speed on the other hand without the need for clutching and shifting mechanisms.

This is accomplished in this invention by utilizing a planetary gear train to couple the source of power (e.g., the engine) to the load and a torque feedback from the planetary gear train to the input shaft in which a hydraulic motor-pump combination is provided in a preferred embodiment to adjust the feedback to produce the desired ratio of input to output torque and speed. In some arrangements, other infinitely variable arrangements can be substituted for the hydraulic motor-pump combination such as a fluid couplings, differential cones or variable electric transmission devices.

A preferred embodiment of this invention comprises a planetary gear train having ring gear, a plurality of planetary gears supported by a planetary gear holder, and a sun gear. Power to the transmission is delivered by an input shaft connected to said holder. The sun gear delivers the output by a shaft connected to the load. An adjustable torque feedback to match the load to the source of power includes a variable displacement hydraulic motor whose rotor is coupled to the input shaft and a fixed displacement hydraulic pump whose output is delivered to said motor. The rotor of said pump is geared to and driven by the ring gear of the planetary gear train. Means is provided to adjust the hydraulic displacement of the motor while the transmission is operating. This control adjusts the feedback torque in the transmission and effectively provides perfect coupling between input torque and speed and output torque and speed as the volume of fluid being pumped is directly proportional to the input and output torque and speed ratios. Other features, such as the addition of a speed reducer and multiplier and a gear box connected to the output shaft, produce a highly efficient and reliable transmission which is infinitely variable. Other preferred embodiments of this invention reduce the size requirements of the hydraulic pump.

It is thus a principal object of this invention to provide an infinitely variable transmission which does not rely on clutching and shifting mechanisms.

Other objects and advantages of this invention will hereinafter become obvious from the following description of a preferred embodiment of this invention.

DESCRIPTION OF THE PREFERRED EMBODIMENT

Figure 1:
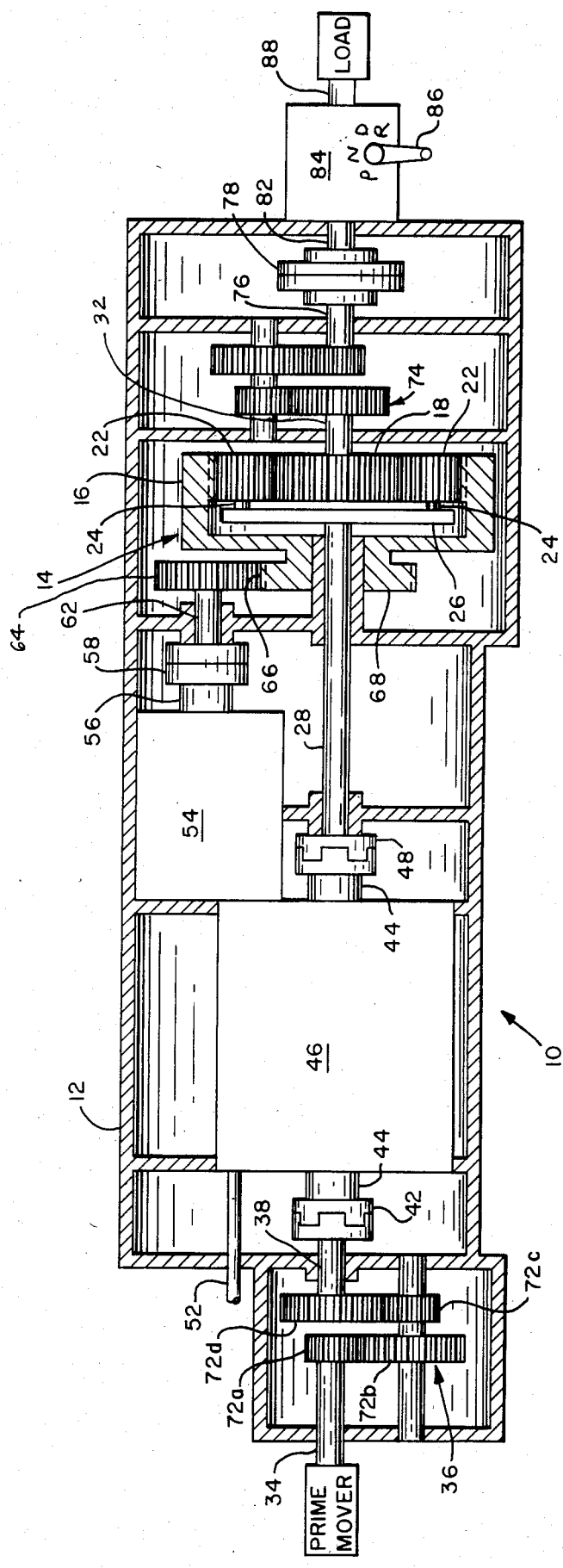
FIG. 1 is an elevation view in section, partially schematic, of a preferred embodiment of this invention.

Referring to FIG. 1, hydromechanical transmission 10 consists of a housing 12 containing a planetary gear train 14 consisting of a ring gear 16, a sun gear 18, and planetary gears 22. The latter are supported for rotation by studs of shafts 24 mounted on a planetary gear holder 26 supported by and rotating with a shaft 28 which provides the input to planetary gear train 14. The output for the latter is a shaft 32 connected to sun gear 18. Planetary gear train 14 is conventional in configuration.

Input to transmission 10 is from a shaft 34 which is driven by a prime mover such as an internal combustion engine. Shaft 34 is connected to shaft 28 by way of a gear train 36, shaft 38, a clutch 42 whose purpose is to allow assembly and disassembly of transmission 10, and shaft 44 which is connected to or is part of the rotor of variable displacement hydraulic motor 46. Shaft 44 is connected to shaft 28 through a clutch 48 whose purpose is the same as that of clutch 42.

A control shaft 52 extending from hydraulic motor 46 out of housing 12 permits selective control of the volume or displacement of hydraulic fluid within motor 46. Such motors and their controls are well known in the art as shown in some of the patents referred to hereinabove so that a detailed description thereof need not be contained herein.

Hydraulically connected to motor 46 is a fixed or variable displacement hydraulic pump 54 whose rotor is mechanically connected by way of a shaft 56 through a clutch 58 and a shaft 62 to a gear 64. Under some circumstances pump 54 may be a variable displacement pump. The purpose of clutch 58 is to protect hydraulic pump 54 and motor 46 from the sudden application of large forces on the load side of transmission 10. It will be noted that gear 64 is meshed with teeth 66 on a hub 68 attached to ring gear 16 previously described. Thus rotation of ring gear 16 will cause hydraulic pump 54 to rotate and supply motor 46 with hydraulic fluid under pressure. The rotor of motor 46 is rotating along with shaft 44 which transmits power input to planetary gear train 14 as already described.

Gear train 36 in this arrangement is designed to reduce speed within transmission 10 to levels more compatible with speed ranges usually associated with hydraulic motors and, typically, where the power source is an internal combustion engine, the reduction may be of the order of 4:1. Gear train 36, as is understood in the art, may consist of an assembly of four gears 72a, 72b, 72c, and 72d arranged as illustrated with gears 72b and 72c mechanically connected, and gears 72a and 72d connected to their respective input and output shafts 34 and 38. The relative diameters of these gears determine the speed reduction obtained.

In a like fashion, the output from planetary gear train 14 on shaft 32 from sun gear 18 is delivered to a gear train 74 which in this case steps up the output speed of transmission 10 to that which is desired. In some situations either or both or gear trains 36 and 74 may be dispensed with, or the reduction or multiplication varied or reversed to meet particular circumstances.

The output of transmission 10 from gear train 74 is delivered by way of a shaft 76, a breakaway clutch 78 whose purpose is similar to that of clutch 58, and a shaft 82 through transmission assembly 84 to shaft 88 and the load.

Transmission assembly 84 may be a completely mechanical transmission designed to allow for either drive, reverse, park, or neutral, a selection lever 86 being provided for this purpose. Such a device is conventional and does not form a part of this invention, and depending upon the application of transmission 10 may not be required. Where transmission assembly 84 is employed, clutch 78 may be an operational clutch as is understood in the art. It is understood also that assembly 84 may also allow for a selection of gear ratios between shafts 82 and 88 thus permitting fixed torque multiplication between these two shafts.

In the operation of transmission 10, consider selection lever 86 in drive (that is, a load on shaft 82), with input shaft 34 driven by the prime mover at some operating speed.

Assume that the torque output on shaft 82 or 88 is insufficient to move the load so that both of the former and sun gear 18 are not rotating. As shaft 28 and planetary gear holder 26 are rotating, so do planetary gears 22, and ring gear 16 rotates in the same direction as shaft 28. This rotation is transmitted to pump 54 which supplies hydraulic fluid under pressure to motor 46. This condition where there is a shaft input and the output shaft is stationary is referred to herein as the transmission being in hydraulic neutral (as distinguished from mechanical neutral where selection lever 86 is in the N position) and occurs only for a particular ratio of pump and motor volumes. Where the gear ratio of gear 64 to teeth 66 on hub 68 is such that shafts 56 and 28 rotate at the same speed, then the hydraulic neutral position of transmission 10 corresponds to a ratio of one-to-one, that is, with equal pump and motor volumes.

In order to increase the torque output of transmission 10 and hence move the load, control shaft 52 is moved to reduce the displacement volume within motor 46. Since the speed of motor 46 is determined by the speed of shaft 44 and the hydraulic fluid is incompressible, pump 54 will slow down causing the rotational speed of ring gear 16 also to slow down. As the rotational speed of planetary gear holder 26 is largely unaffected by the preceding course of events, sun gear 18 begins to rotate and transmission 10 moves out of its hydraulically neutral position and the load is moved.

Adjustment of control shaft 52 is then used to match the torque and speed of the input to transmission 10 to that of the torque and speed needs of the load. The volume of fluid being pumped, as determined by shaft 52, is directly proportional to the input to output torque ratio and hence inversely proportional to the speed ratio.

To illustrate this relationship in geater detail, consider the rotational speed of shaft 28 as being equal to $W_1$, the speed of sun gear 18 as $W_4$, the speed of ring gear 16 as $W_2$, and the speed of each planetary gear to be $W_3$. Also, let the radii of the gears be given as $R_4$ for sun gear 18, $R_2$ for ring gear 16, $R_3$ for each planetary gear 22, and $R_1$ for the radius of the planetary gear holder 26 measured from the center line of shaft 28 to the axis of rotation of planetary gears 22.

The linear velocity v on the surface of a rotating member is equal to the vector cross product of the rotational velocity W and the radius R, or $$v = W \times R \quad \text{Eq. 1}$$

where v, W, and R are vector quantities.

The linear velocities of mating gears where contact is made are equal to each other so that the following relationships exist for the gears in the planetary gear train 14:

$$W_1 R_2 + W_3 R_3 = W_2 R_2 \quad \text{Eq. 2}$$

and $$W_1 R_4 - W_4 R_4 \quad \text{Eq. 3}$$

Solving simultaneous Eqs. 2 and 3 yields $$[W_1(R_2 + R_4) - W_2 R_2]/R_4 = W_4 \quad \text{Eq. 4}$$

For the hydraulic neutral position of transmission 10 described above where $W_4$ 0, and $W_1$ and $W_2$ rotating in the same direction deduced from a physical examination of the gear train, the value of $W_2$ is as follows:

$$W_2 = W_1 (R_2 + R_4)/R_2 \text{ where } W_4 = 0 \quad \text{Eq. 5}$$

When control shaft 52 is adjusted to reduce the displacement within motor 46, slowing down pump 54 and ring gear 16, hence $W_2$ declining in value, it will be seen from Eq. 4 that $W_4$ will increase as previously noted. Shaft 32 will begin to rotate. At some point, the rotational speed $W_1$ of shaft 28 will equal that of speed $W_4$ of sun gear 18 and shaft 32.

As pump 54 continues to slow down as displacement is reduced further in motor 46, speed $W_2$ of ring gear 16 is reduced further and $W_4$ continues to increase. The pressure of hydraulic fluid being delivered by pump 54 to motor 46 reaches a value proportional to the loading force present at shaft 32.

It can be seen that torque is added to the input torque appearing at shaft 44 and it is the sum of these torques which appears at shaft 44 and 28. For this reason the motor-pump combination (46, 54) is referred to in this embodiment as the torque feedback unit.

To appreciate more fully the relationship between the input torque and the feedback torque, consider the forces involved in planetary gear assembly 14. For purposes of simplicity, consider only the case for which the speeds of shafts 34, 82, and 88 are constant (and hence power throughput is constant). With this as the case then the force on sun gear 18 is constant. Since this force is supplied by planetary carrier 26 via planetary gears 22, it must be opposed by an equal force on the other side, and this force is the force which appears at ring gear 16. Thus for the special case mentioned, the force on ring gear 16 equals the force on sun gear 18. The force presented to planetary carrier 26 is simply the linear sum of these two forces. If F is the force on sum gear 18, then $FR_4$ is the output torque, $FR_2$ is the torque supplied to gear 66 and $2FR_1$ is the input torque which must be provided by shaft 28. Because of the force at pump 54 a pressure rises in the fluid and this pressure also acts on motor 46, adding torque to shaft 28.

The torque multiplication of transmission 10 is calculated by dividing the output torque present at shaft 88 by the input torque on shaft 34. Looking at Eq. 4, it is seen that the output speed $W_4$ depends on both $W_1$ and $W_2$, that is, for any $W_4$ there is no unique $W_1$ and $W_2$, but only a unique difference. This is what permits shaft 28 ($W_1$) to rotate at a much higher speed than shaft 32 (sun gear 18, speed $W_4$), and provide torque multiplication in the process.

Adjustment of control shaft 52 changes the relationship of $W_2$ to $W_1$ and the amount of torque feedback and the system, thereby rendering infinitely variable the relationship between output and input speed and torque.

The range of adjustment for practical purposes is limited by the type of prime mover involved and the input speed and torque fed into transmission 10 by way of shaft 34. It is understood that the speed of the prime mover can be adjusted when it is desired to move from one range of operation to another. In any event it is seen that there is provided a basis for perfect speed and torque coupling between input and output without any need for clutching and shifting mechanisms.

In the preferred embodiment just described, pump 54 is subject to high fluid pressure at low speeds and under starting conditions. This is due to the fact that all of the force from the load is present at the pump which is perhaps the most expensive component of the system when designed for those pressures.

In another preferred embodiment of this invention some of the force from the load can be returned by way of purely mechanical means bypassing the pump.

Figure 2:
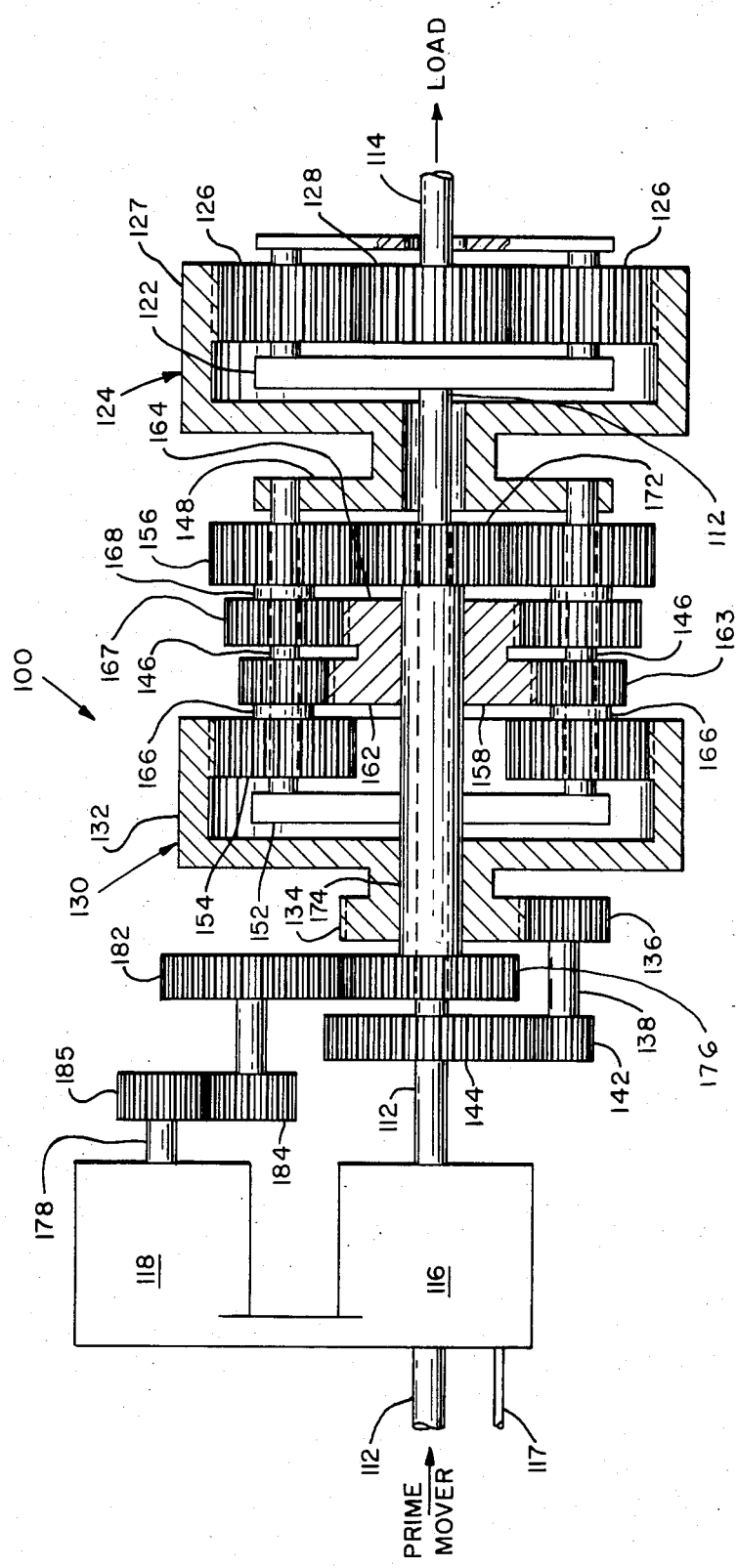
FIG. 2 is a partially schematic view of the internal elements of another preferred embodiment of this invention in which some of the torque feedback is by mechanical means.

Referring to FIG. 2, there is illustrated the internals of such a torque feedback transmission 100 without speed reducer or multiplier, or a transmission assembly, which could be utilized as described in connection with transmission 10 in FIG. 1.

Transmission 100 is provided with an input shaft 112 and an output shaft 114, a variable displacement hydraulic motor 116, with control shaft 117, mounted on shaft 112 and a fixed displacement hydraulic pump 118 hydraulically connected to motor 116.

Shaft 112 is connected at the far end from motor 116 to the planetary gear holder 122 in a planetary gear assembly 124 which supports planetary gears 126 engaged with a ring gear 127 and sun gear 128 connected to output shaft 114. It is seen that planetary gear assembly 124 is equivalent to planetary gear train or assembly 14 in FIG. 1. However, instead of ring gear 127 being directly coupled to hydraulic motor 118 it will be seen from the description which follows that the feedback is split between pump 118 and a mechanical coupling to shaft 112.

To effect this mechanical coupling, a second planetary gear train or assembly 130 is provided in which ring gear 132 is coupled through a gear train consisting of a hub gear 134 engaged with a gear 136 mounted on a shaft 138 on the opposite end of which is a pinion 142 engaged with a gear 144 mounted on shaft 112.

Torque feedback from planetary gear assembly 124 to assembly 130 is by way of a plurality of shafts 146 supported at one end by collar 148 on ring gear 127 of assembly 124 and on the other end by planetary gear holder 152 in assembly 130. Planetary gears 154 on shafts 146 are engaged with ring gear 132. Shaft 174 rotates independently of carrier 152.

To obtain torque feedback from planetary gear assembly 124 to hydraulic pump 118, it will be seen that on shafts 146 adjacent collar 148 there is a planetary arrangement of pinions 156 which are free to rotate independently of shafts 146. A gear assembly 158 consisting of gears 162 and 164 maintains a fixed ratio between gears 154 and 156. Gear 162 is connected by way of gears 163 and hollow shafts 166 to planetary gears 154, while gear 164 is connected by way of gears 167 and hollow shafts 168 to pinions 156. A sun gear 172 is engaged with planetary pinions 156 and through a hollow shaft 174 to a gear 176 connected to drive shaft 178 into pump 118 through a gear chain consisting of gears 182, 184 and 185. The use of gear assembly 158 to adjust the drive ratio between gears 154 and pinions 156 permits selection of any desired ratio and may be avoided if a one-to-one ratio is selected.

The presence of gear assembly 158 modifies the basic equations of motion for assembly 130 as follows:

$$W_1 R_2 + W_3 R_3 = W_2 R_2$$

$$W_1 R_1 - W_3' R_3 = W_4 R_1$$

$$W_3 = A W_3' \qquad \text{Eq. 6}$$

where
$R_1$ is the radius of sun gear 172;
$R_2$ is the radius of ring gear 132;
$R_3$ is the radius of gears 154 and 156;
$W_1$ is the rotational velocity of collar 148;
$W_2$ is the rotational velocity of ring gear 132;
$W_3$ is the rotational velocity of gears 154 and 156; and
$W_4$ is the rotational velocity of sun gear 172.
solving simultaneously $$W_1(R_2 + A R_1) = W_2 R_2 + A W_4 R_1 \qquad \text{Eq. 7}$$

where the value of A is selected to satisfy other system requirements to be discussed later.

It can be seen that in the torque feedback unit consisting of the planetary gear systems 124 and 130 there are no fixed inputs, and in fact the equation of motion seen in Eq. 7 has four unknowns. As ring gear 132 is joined to input shaft 112 by way of gears 136, 142, and 144, then $W_2$ must equal the product of K and $W_i$ where K is the fixed ratio provided by the above gears, and $W_i$ is the input speed of shaft 112.

When sun gear 128 is stationary, ring gear 127 rotates at a speed equal to $W_i(R_2 + R_1)/R_2$ if the ratio of gears 134, 136, 142, and 144 is set to this value, then ring gear 132 and shaft 112 rotate at the same speed, causing sun gear 172 to rotate at this speed, this being described as a lock-up condition for gear assembly 130. When lock-up occurs in planetary gear assembly 124, which is the primary feedback unit, ring gear 127, sun gear 128, and input shaft 112 all rotate at the same speed, $W_i$. The speed of ring gear 132 equals K times the input velocity ($W_i$) where K is the ratio of the gear train consisting of 134, 136, 142, and 144. This leaves only A and $W_4$, equivalent to the velocity of shaft 178, unspecified. If primary unit 124 and unit 130 were indentical in every respect, and A=1, then the speed of sun gear 172 would be zero. This may be an undesirable situation depending on the type of pump because pump 118 may be operating very inefficiently at this speed. To avoid this, $W_4$ is chosen to be some value less than either $W_2$ or $W_1$ for which pump 118 will still operate efficiently. With $W_4$ chosen along with some values of $W_1$ and $W_2$, then A is specified. If K were set to be equal to unity, then the primary unit 124 and unit 130 will lock up at the same time when the in-put and output shaft speeds are the same, in which case case $W_4$ will be greater than $W_2$ or $W_1$ when sun gear 128 is stationary.

The speed of shaft 178 can be selected to best suit the requirements of the differential control unit, which in this case is the combination of motor 116 and pump 118, but in other cases could be any other variable arrangement such as variable sliding cones or a variable electric motor.

Analysis of power flow through the torque feedback arrangement consisting of planetary gear systems 124 and 130 and through gear train 176–185 to hydraulic pump 118 shows that the distribution of power between the mechanical and hydraulic feedbacks is velocity independent and depends on the gear ratios built into the system.

Figure 3:
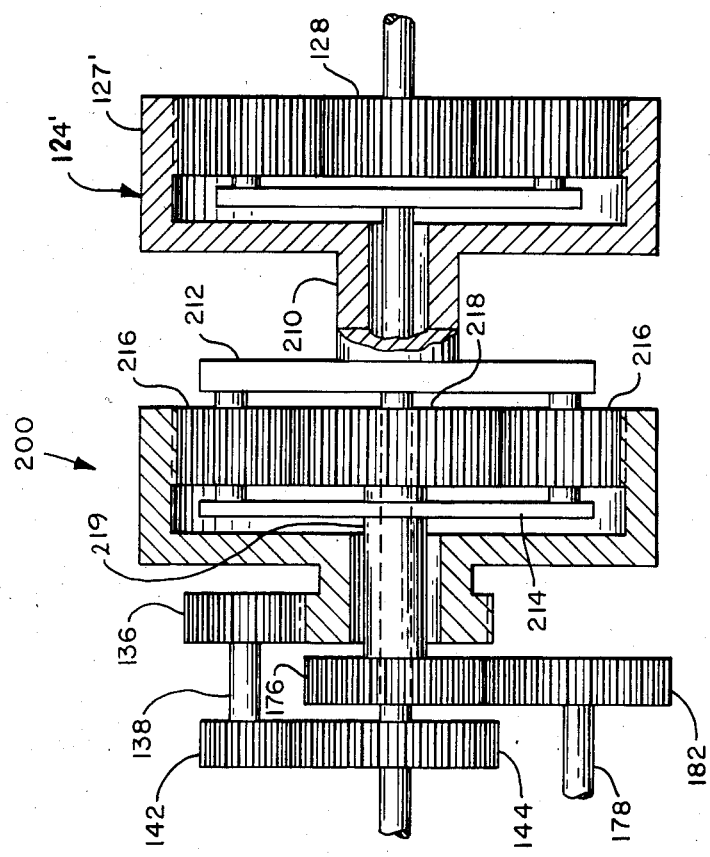
FIG. 3 is a modification of the arrangement shown in FIG. 2.

It should be pointed out that gear assembly 158 may be eliminated and the same result accomplished by making sun gear 172 larger than sun gear 128. This simplified arrangement is shown in FIG. 3 wherein it is seen that in transmission 200 ring gear 127' of planetary gear assembly 124' is connected directly through a hollow sleeve 210 to a carrier 212 supporting along with carrier 214 planetary gears 216 which are engaged with sun gear 218. Hollow shaft 219 connecting gear 176 to sun gear 218 rotates independently of carrier 214. It is noted that gear 182 is connected directly to shaft 178. The only purpose of the additional gearing (176–185) shown in FIG. 2 is to insure identical direction of rotation of shafts 112 and 178. As noted, the diameter of sun gear 218 is larger than the diameter of sun gear 128 in FIG. 3. Except for the simplification just described, transmission 200 in FIG. 3 is the same as and operates identically to transmission 100 shown in FIG. 2.

Instead of providing the torque feedback directly or splitting the latter between mechanical and hydraulic arrangements as hereinbefore described the same result can be accomplished, utilizing the principles of this invention, by supplying some of the input power directly to the output shaft through a torque splitting unit to reduce the load on the hydraulic pump-motor combination.

Figure 4:
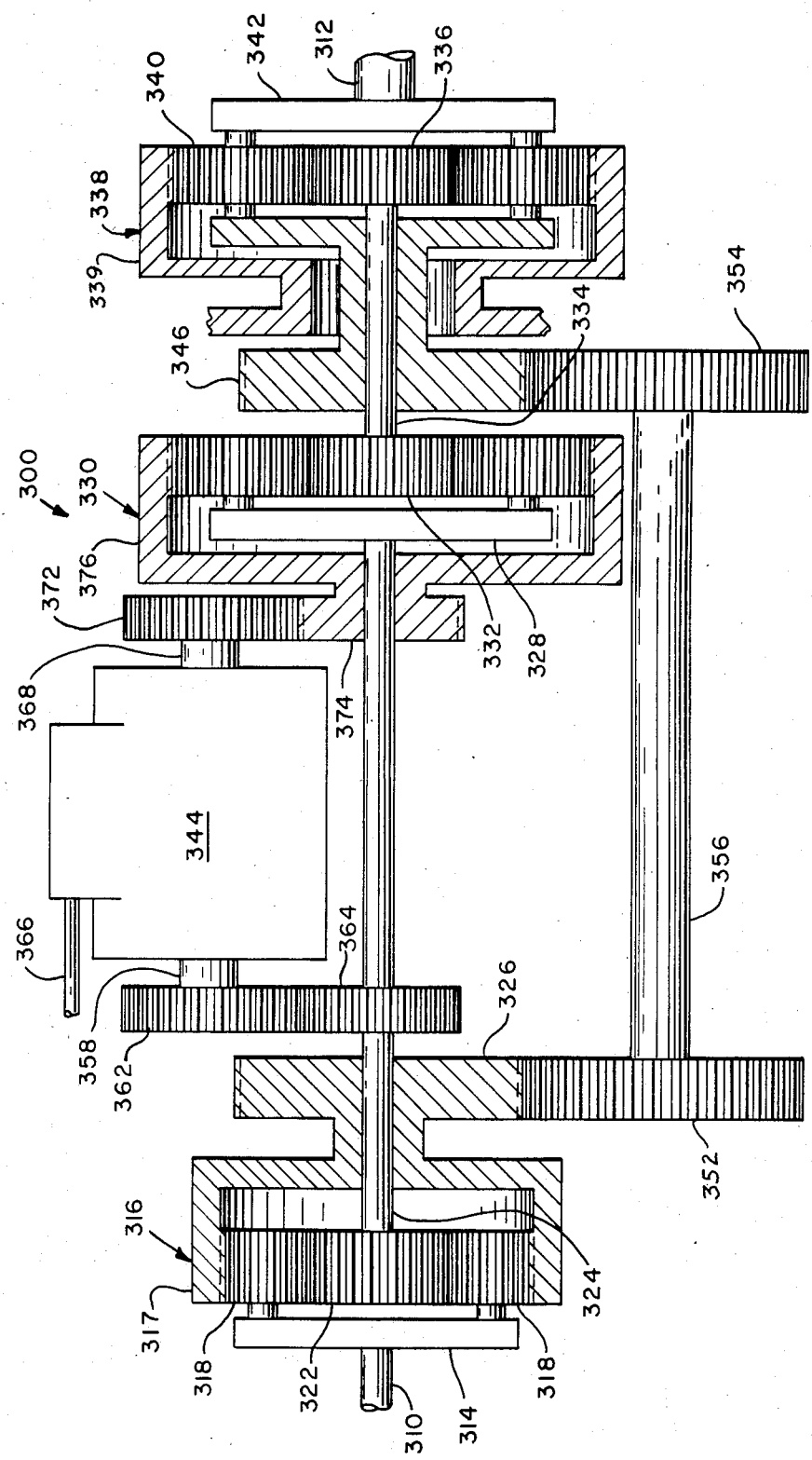
FIG. 4 is a partially schematic view of the internal elements of another preferred embodiment in which some of the input power is delivered directly to the output shaft.

Referring to FIG. 4, there is illustrated the internal arrangement of such a transmission 300 consisting of an input shaft 310 receiving power from a prime mover (not shown) and an output shaft 312. Input shaft 310 delivers its power to a planetary gear carrier 314 in a planetary gear train or assembly 316 comprising ring gear 317, planetary gears 318 and a sun gear 322 with an output shaft 324.

The output of planetary gear train 316 is split mechanically between a hub gear 326 connected to ring gear 317 and shaft 324. The latter terminates in and is connected to planetary holder 328 in planetary gear train 330 whose sun gear 332 is interconnected by a shaft 334 to sun gean 336 of a planetary gear train 338. Ring gear 339 is fixed against rotation by being connected to the housing (not shown). Planetary gears 340 deliver the output of transmission 300 to output shaft 321 by way of planetary holder 342.

The torque feedback unit 344 to be described later is bypassed completely with power being transmitted directly to output shaft 312 by hub gear 326 which is connected to hub gear 346 of planetary gear holder 348 in planetary gear train 338 by way of gears 352 and 354, and shaft 356. Gear 346 rotates independently of shaft 334.

However, output shaft 324 from sun gear 322 in planetary gear train 316 receives torque feedback from the hydraulic motor in torque feedback unit 344 by way of motor shaft 358, gear 362, and gear 364 mounted for rotation with and on shaft 324. Control element 366 permits adjustment of the hydraulic displacement within the motor.

The hydraulic pump within unit 344 receives its power from pump shaft 368 connected by way of gear 372 and hub gear 374 on ring gear 376 in planetary gear train 330. Gear 374 rotates independently of shaft 324.

By adjusting the ratios of gears 362 and 364 and 326 and 352, it is possible to obtain some or all of the reduction that may be necessary between the transmission and the prime mover.

In the transmission just described, $$T_i = P_i/W_i \qquad \text{Eq. 8}$$

where $P_i$ and $W_i$ are the input power and rotational velocity, respectively, and $T_i$ is the input torque.

Since $$T_o = T_i W_i / W_o \qquad \text{Eq. 9}$$

where $T_o$ and $W_o$ are the output torque and rotational velocities, respectively, it will be seen that as input power $(T_i W_i)$ increases, there results in a reduction in pump and motor pressure by supplying torque directly to output shaft 312.

In the embodiments described, the motor-pump combination consists of a motor which has a rotor of variable displacement in order to permit adjustment of the torque feedback and thereby match load requirements to the input. Under some circumstances other types of variable feedback couplings can be employed such as a fluid coupling, differential cones, or variable electric transmission devices.

In addition, depending on the type of variable coupling used for the torque feedback, the transmission of this invention may be fully reversible, that is, the load and power sides reversed.

It is thus seen that there has been provided hydromechanical transmissions of simple and economic design capable of being infinitely variable in clutch free operation, that is, without resort to clutching and shifting mechanisms during operation. Many variations of this invention are possible without departing from the principles of this invention as defined in the claims which follow.

What is claimed is:

1. An infinitely variable transmission of inline configuration for interconnecting a prime mover with a load for clutch free operation in a range of speed including hydraulic neutral comprising:

a. planetary gear train means having a ring gear, a plurality of planetary gears supported by a planetary gear carrier, and a sun gear, said sun gear being connected mechanically to said load, output shaft means for joining said said sun gear to said load;

b. variable torque feedback means comprising (i) a variable displacement hydraulic motor whose rotor shaft is in line with said output shaft means and drivingly connected to said prime mover and said planetary gear carrier during the full range of operation of said transmission, and (ii) a fixed displacement hydraulic pump connected hydraulically to said motor, the rotor shaft of said pump being connected mechanically to said ring gear and being axially displaced from said output shaft means c. means for adjusting the displacement volume within said hydraulic motor for controlling the torque feedback in said transmission to provide infinitely variable coupling between said prime mover and said load over the full range of said transmission including hydraulic neutral;

d. a speed reducer between said prime mover and said motor rotor shaft and a speed multiplier between said sun gear and said load; and e. mechanical transmission assembly means between said speed multiplier and said load in line with said motor rotor shaft and said output shaft means for providing selection of drive, reverse, park, and neutral.

* * * * *